United States Patent
Janakiraman et al.

(10) Patent No.: US 12,541,430 B2
(45) Date of Patent: Feb. 3, 2026

(54) GENERATING FILE-BLOCK CHANGE INFORMATION FOR A BACKUP

(71) Applicant: Hewlett Packard Enterprise Development LP, Spring, TX (US)

(72) Inventors: Viswesvaran Janakiraman, San Jose, CA (US); Anoop Kumar Raveendran, Karnataka (IN); Rachit Gupta, Karnataka (IN); Jothivelavan Sivashanmugam, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/892,829

(22) Filed: Sep. 23, 2024

(65) Prior Publication Data
US 2025/0348383 A1 Nov. 13, 2025

(30) Foreign Application Priority Data
May 7, 2024 (IN) .............................. 202411036009

(51) Int. Cl.
*G06F 11/14* (2006.01)
(52) U.S. Cl.
CPC ...... *G06F 11/1448* (2013.01); *G06F 2201/80* (2013.01)
(58) Field of Classification Search
CPC .......................... G06F 11/1448; G06F 2201/80
See application file for complete search history.

(56) References Cited

U.S. PATENT DOCUMENTS 11,645,161 B2 * 5/2023 Slater ...................... G06F 16/13
707/649

OTHER PUBLICATIONS

Varonis, "Data Activity Auditing," accessed Nov. 15, 2023, <https://www.varonis.com/use-case/data-activity-auditing>, 12 pages.
Varonis, "Fighting a Different Battle: Varonis' Unique Approach to Cybersecurity,"2021, <https://info.varonis.com/hubfs/Website_Reboot/Whitepapers/ENGLISH-Whitepapers/Whitepaper-Fighting_a_Different_Battle_Varonis_Unique_Approach_to_Cybersecurity.pdf?hsLang=en>, 9 Pages.
Varonis, "Varonis Data Security Platform," accessed Nov. 15, 2023, <https://info.varonis.com/hubfs/Website_Reboot/Product_Datasheets/ENGLISH-Product_Datasheets/Product_Datasheet-Varonis_Overview.pdf?hsLang=en>., 2 pages.

(Continued)

*Primary Examiner* — Tony Wu
(74) *Attorney, Agent, or Firm* — Hewlett Packard Enterprise Patent Department

(57) ABSTRACT

Example implementations relate to computer data storage. In some examples, a filesystem scanner identifies files in a filesystem, where each file comprises logical blocks, and where the filesystem is included in a backup. The filesystem scanner generates a read buffer to store a logical block of a file. A block filter driver determines that the read buffer includes a predefined signature, and in response determines whether the logical block was modified in the backup. In response to a determination that the logical block was modified in the backup, the block filter driver sets a modification flag in the read buffer to a value indicating that the logical block was modified.

20 Claims, 6 Drawing Sheets

(56) References Cited

OTHER PUBLICATIONS

çalayan Dökme, "Enhancing the file access speed via direct I/O in Linux", Medium, available online at <https://medium.com/@caglayandokme/enhancing-the-file-access-speed-via-direct-i-o-in-linux-f18a46af068f>, Feb. 18, 2022, 11 pages.
Dell Inc, "CyberSense® for PowerProtect Cyber Recovery," Solution Brief, available Feb. 29, 2024, <https://web.archive.org/web/20240229220712/https://www.delltechnologies.com/asset/en-in/products/data-protection/briefs-summaries/h18214-cybersense-for-dellemc-powerprotect-cyber-recovery-solution-brief.pdf>, 2 pages.
Gaurav Chawla, "Rise of Data-Centric Computing with Computational Storage", available online at <https://www.dell.com/en-us/blog/rise-of-data-centric-computing-with-computational-storage/>, May 16, 2022.
Index Engines Inc., "Dell PowerProtect Cyber Recovery with CyberSense®", available online at <https://web.archive.org/web/20240223081420/https://indexengines.com/cybersense-for-dell-emc>, available Feb. 29, 2024, 6 pages.
Milenkoski et al., "Crimeware Trends | Ransomware Developers Turn to Intermittent Encryption to Evade Detection", available online at <https://www.sentinelone.com/labs/crimeware-trends-ransomware-developers-turn-to-intermittent-encryption-to-evade-detection/>, Sep. 8, 2022, 14 pages.
Staff Writer, "Two-thirds of data available to firms goes unused", available online at <https://www.frontier-enterprise.com/two-thirds-of-data-available-to-firms-goes-unused/>, Jul. 24, 2020, 2 pages.

\* cited by examiner

Machine Readable Medium 600

610
Identify, by a filesystem scanner, a plurality of files included in a filesystem, where each file in the filesystem comprises one or more logical blocks, and where the filesystem is included in a backup

620
Generate, by the filesystem scanner, a read buffer to store a logical block of a file included in the filesystem

630
Determine, by a block filter driver, whether the read buffer includes a predefined signature indicating a block change detection operation

640
In response to a determination that the read buffer includes the predefined signature, determine, by the block filter driver, whether the logical block was modified in the backup

650
In response to a determination that the logical block was modified in the backup, set, by the block filter driver, a modification flag in the read buffer to a value indicating that the logical block was modified

FIG. 6

GENERATING FILE-BLOCK CHANGE INFORMATION FOR A BACKUP

BRIEF DESCRIPTION OF THE DRAWINGS

Some implementations are described with respect to the following figures.

FIG. 6 is a diagram of an example machine-readable medium storing instructions in accordance with some implementations.

Figure 1:
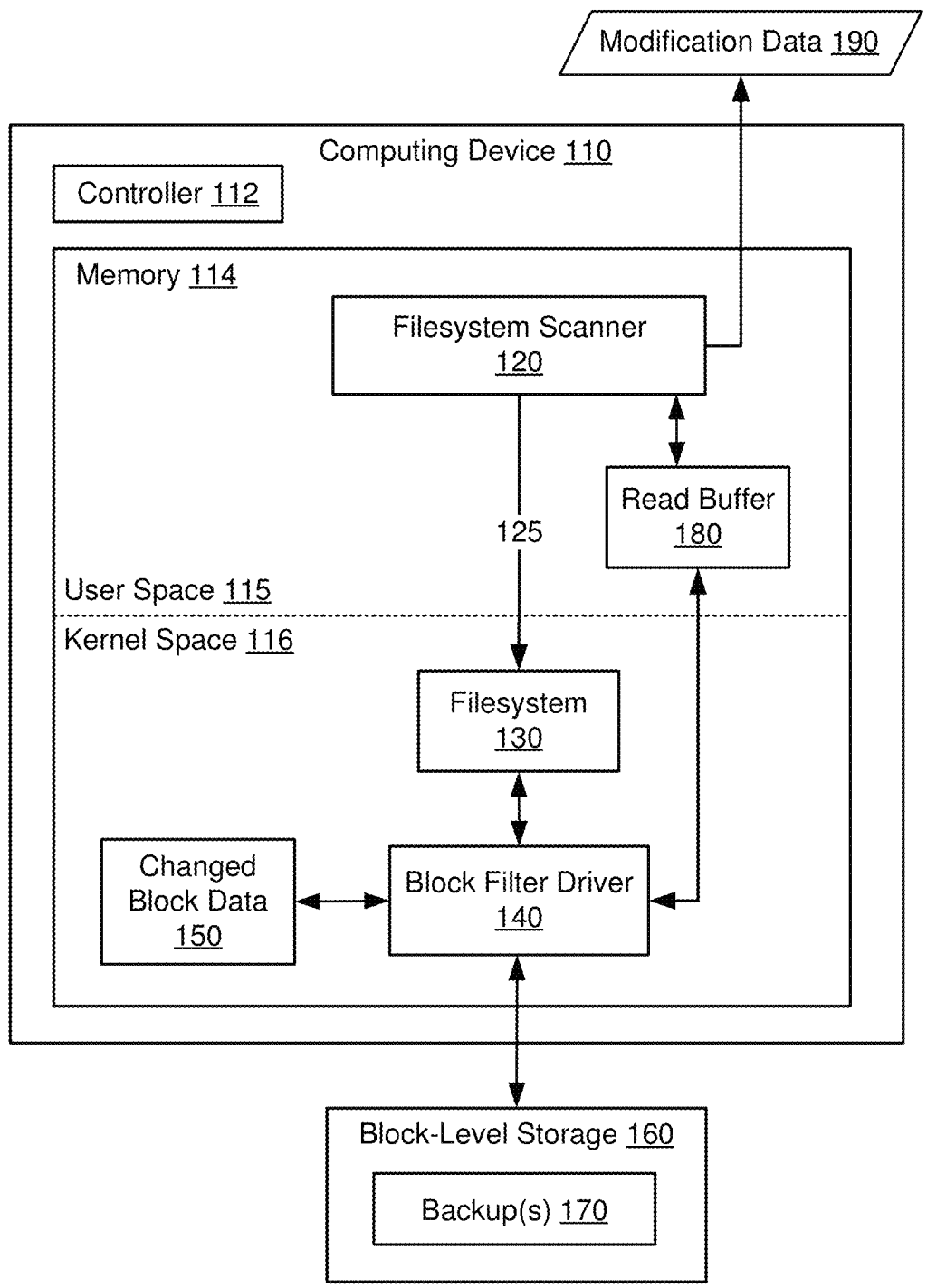
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. As used herein, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a collection of data may be specified in terms of one or more elements of a filesystem. As used herein, a "filesystem" is a system for organizing data that is stored in a storage device. For example, a filesystem may include a collection of data files stored in a hierarchy of directories (e.g., including a root directory and one or more levels of sub-directories). In order to present the data as a collection of data files and directories, the filesystem may maintain structures of metadata. The term "metadata," in the context of a filesystem, refers to information that describes volumes, files and directories, but this information is not part of the stored data files. For example, the following information items describe a data file and are considered as part of the file's metadata: a file name, file size, creation time, last access/write time, user id, and block pointers that point to the actual data of the file on a storage device. Information items that compose metadata of a directory mainly include names and references to data files and sub-directories included in the directory.

In some examples, a collection of data may be stored on a block-based storage device. As used herein, a "block-based" storage device may refer to a device that stores data at a block level. In examples described herein, the term "block level" refers to a level of data storage that is below a file and directory level of data storage. In such examples, a block level may be a level at which a block-based storage device may store data thereon, and a level upon which files and directories are implemented by a filesystem. The block-based storage device may receive the data blocks making up a collection of data as a stream of data blocks.

In some examples, a backup process of a computing system may include copying data blocks stored in a storage device (e.g., a storage array) to a backup device that may store the data blocks in the form of a backup. In examples described herein, a "backup" may refer to a form in which a backup device stores a collection of data, which may be different from a form in which the data blocks are stored on a storage device (e.g., storage array) from which they are being backed up. For example, a backup may comprise a deduplicated representation of the data blocks copied to the backup device for backup. In some examples, a backup process may copy, to a backup device, a specified collection of data that is stored on a storage device in files and directories of a filesystem.

In some examples, the specified collection of data to be copied to the backup device may comprise one or more volumes of a storage device, some or all contents of a filesystem in which data is stored on a storage device (e.g., all data stored under a given directory, such as a root directory or one or more sub-directories), or the like. When generating a full backup, a backup process may copy all data blocks of the specified collection of data to the backup device (which the backup device may store as a backup referred to as a "full backup" herein). When generating an incremental backup, a backup process may copy exclusively the data blocks of the specified collection of data that have changed since a prior backup, and the backup device may store these changed blocks in a form referred to as an "incremental backup" herein. As used herein, a "snapshot" may be a representation of the data included in storage volume(s) (or other collection(s) of data) at a particular point in time. For example, a full backup may represent a snapshot at an initial point in time, and the combination of the full backup and an incremental backup may represent a different snapshot at a later point in time.

In some examples, it may be useful to identify which files and file-blocks (i.e., data blocks in the files) have been modified in a particular backup. For example, such information may be used to detect the presence of ransomware that has maliciously encrypted a portion of the data in a filesystem. Further, in some examples, identifying the modifications in a filesystem may involve retrieving backup data from storage, mounting the filesystem, identifying the files in the filesystem, reading the file metadata (e.g., the "last modified" timestamp), and comparing this information to earlier versions of file metadata. However, such techniques may be subject to timestamp manipulation by malware, and may not provide details about block-level modifications within a file.

In accordance with some implementations of the present disclosure, a computing device may execute a filesystem scanner and a block filter driver to determine which files and data blocks have been modified in a particular backup. The filesystem scanner may identify each file in a filesystem, and may issue read calls to retrieve the data blocks in the identified files. Further, the filesystem scanner may write a special signature into the read buffers for the read calls. The block filter driver may intercept each read call, and in response may determine whether the special signature is present in the read buffer associated with the read call. If the special signature is present in the read buffer, the block filter driver prevents the normal execution of the read call (e.g., by the operating system) to retrieve the requested data blocks, and instead performs an alternative function or operation (referred to herein as "block change detection") to determine whether the requested data blocks were modified in a recent backup. In some implementations, a block change detection operation may involve performing a look-up of the requested data blocks in a changed-block data structure. Subsequently, the block filter driver may populate the read buffer with block change information indicating which data blocks (if any) were modified in the backup. The filesystem scanner may obtain the block change information from the read buffer, and may use this information to generate a modification report. In this manner, some implementations may provide block change information that identifies modifications to the filesystem that occur at the data block level, and that is generated in a manner that is not subject to timestamp manipulation by malware. Various aspects of the disclosed technique are discussed further below with reference to FIGS. 1-6.

FIG. 1—Example System

FIG. 1 shows an example system 100, in accordance with some implementations. The system 100 may include a computing device 110 and a block-level storage 160. The computing device 110 may be a physical computing device (e.g., server, appliance, desktop, etc.), a virtual computing device (e.g., virtual machine, container, etc.), and so forth. Further, the block-level storage 160 may be all or a part of a local storage device, a storage appliance, a storage array, remote storage service, and so forth. In some implementations, the computing device 110 and the block-level storage 160 may be implemented in different devices and/or locations. However, in other implementations, the computing device 110 and the block-level storage 160 may be implemented in a single device and/or system (e.g., a server, a server rack, and so forth).

In some implementations, the block-level storage 160 may be implemented using non-transitory storage media (e.g., hard disk drives, solid state drives), semiconductor memory (e.g., random access memory), and so forth. As shown in FIG. 1, the block-level storage 160 may store a backup 170 (or multiple backups 170) in the form of data blocks. Each backup 170 may represent the state of a given filesystem (or a volume including a filesystem) at a different point in time (e.g., at the time of the most recent backup operation of a volume). Further, in some implementations, the block-level storage 160 may store data blocks in deduplicated form.

In some implementations, the computing device 110 may include a controller 112 and memory 114. The controller 112 may be implemented via hardware (e.g., electronic circuitry) or a combination of hardware and programming (e.g., comprising at least one processor and instructions executable by the at least one processor and stored on at least one machine-readable storage medium). The memory 114 may be implemented in semiconductor memory such as random access memory (RAM). In some implementations, the memory 114 may include a user space 115 and a kernel space 116. The user space 115 may be a portion of the memory 114 that stores user processes being executed by the controller 112. Further, the kernel space 116 may be a portion of the memory 114 that stores an operating system kernel being executed by the controller 112.

In some implementations, the computing device 110 may host or execute a filesystem scanner 120, a block filter driver 140, an operating system (not shown in FIG. 1, and any number of other components. The filesystem scanner 120 and the block filter driver 140 may be implemented by the controller 112 executing instructions (e.g., software and/or firmware) that are stored in a machine-readable storage medium, in hardware (e.g., circuitry), and so forth. In some implementations, the filesystem scanner 120 may be executed in a user space 115, and the block filter driver 140 may be executed in the kernel space 116.

In some implementations, the combination of the filesystem scanner 120 and the block filter driver 140 may be executed to identify the files and data blocks that were modified in a given backup 170. In some examples, the filesystem scanner 120 may access a backup 170 stored in the block-level storage 180, and may mount the filesystem 130 from the accessed backup 170 (e.g., using a Linux "mount" command). In other examples, the filesystem scanner 120 may mount the filesystem 130 from the source volume (not shown in FIG. 1) that is used to generate the backup 170 (e.g., at the time that the backup 170 is generated). The filesystem scanner 120 may traverse the filesystem 130 to identify each file in the filesystem 130. Further, the filesystem scanner 120 may use the filesystem 130 to identify the logical blocks included each file. Each logical block may represent a corresponding physical block that is stored in the backup 170. As used herein, the term "physical block" may refer to a data block having an address that represents the actual physical location of the data block in a storage device or memory, and which is used by system hardware. Further, the term "logical block" may refer to a data block having an address that is a virtual or symbolic representation of its storage location, and which is used by software programs.

In some implementations, the filesystem scanner 120 may generate or otherwise prepare one or more read buffers 180 in the user space 115. Each read buffer 180 may be configured to receive a different logical block included in the identified files. Further, the filesystem scanner 120 may send, to the operating system kernel, one or more read calls 125 to request the logical blocks included in the identified files. In some implementations, the filesystem 130 may receive a read call 125 from the filesystem scanner 120, and may map or translate each logical block (requested in the read call 125) to its corresponding physical block.

In some implementations, a read call 125 may be executed using a direct input/output (I/O) mode or setting. The direct I/O mode may cause the read call 125 to retrieve data directly from storage to a buffer in user space (i.e., without using a buffer in kernel space 116). For example, when using a direct I/O mode, file data requested by the filesystem scanner 120 (e.g., via a read call 125) is transferred directly from the block-level storage 180 to a read buffer 180 in user-space 115, thereby avoiding the use of read buffer(s) in the kernel space 116.

In some implementations, prior to sending a read call 125 for a given file, the filesystem scanner 120 may initiate the direct I/O mode for the read call 125 by opening the file using a command flag or modifier (e.g., establishing a connection to the file by issuing a Linux "OPEN" system call with an "O_DIRECT" flag). The filesystem scanner 120 may populate the read buffer 180 (corresponding to the read call 125) with a special signature indicating a block change detection operation. For example, the special signature may be a predefined bit sequence, text string, numerical string, and so forth. In some implementations, the presence of the special signature in the read buffer prevents the normal execution of the read call 125 (e.g., by the operating system) to retrieve the requested logical blocks, and instead causes the block filter driver 140 to perform a block change detection operation for the requested logical blocks. Further, the filesystem scanner 120 may also populate the read buffer 180 with a modification flag (e.g., a bit value) that is set to an initial or default value (e.g., a value indicating that the requested logical block was not modified in the backup 170).

In some implementations, the block filter driver 140 receives a read call 125 from the filesystem 130 (e.g., after the filesystem 130 translates or maps the logical blocks requested in the read call 125 to the corresponding physical blocks). In response to receiving the read call 125, the block filter driver 140 may determine whether the corresponding read buffer 180 includes the special signature indicating a block change detection operation. If not, the block filter driver 140 may allow the read call 125 to be executed to retrieve the requested data blocks from the block-level storage 160. Otherwise, if it is determined that the read buffer 180 includes the special signature, the block filter driver 140 may perform a look-up for a requested physical block in the changed-block data 150, and may thereby determine whether the physical block was modified in the backup 170. In some implementations, the changed-block data 150 may be a stored data structure (e.g., a bitmap) that is generated along with the backup 170 (e.g., by a backup process).

If the changed-block data 150 indicates that the requested physical block was modified in the backup 170, the block filter driver 140 may set the modification flag (in the read buffer 180) to indicate that the requested logical block was modified in the backup 170. Otherwise, if the block filter driver 140 determines that the changed-block data 150 indicates that the requested physical block was not modified in the backup 170, the modification flag may be set (or left unchanged if already set) to indicate that the requested logical block was not modified in the backup 170.

In some implementations, after issuing a read call 125 for a logical block, the filesystem scanner 120 may read the modification flag in the read buffer 180 to determine whether requested logical block was modified during the backup 170. Further, after processing each file in the filesystem 130 (e.g., by issuing read calls 125 for all logical blocks), the filesystem scanner 120 may generate modification data 190 (e.g., a report, a list, a database, or other data structure) that identifies each file and/or logical block that was modified during the backup 170. In this manner, the filesystem scanner 120 and the block filter driver 140 may provide block change information that identifies the modifications to the filesystem 130 that occur at the data block level, and that is generated in a manner that is not subject to timestamp manipulation by malware. Further, the filesystem scanner 120 and the block filter driver 140 may provide the block change information for any type of filesystem that maintains the mapping of data blocks to files between writes (e.g., a filesystem that does not use copy-on-write technique for memory management).

In some implementations, a single read call 125 may request a set of multiple logical blocks that are contiguous within a file. In such implementations, the filesystem scanner 120 may generate a set of multiple read buffers 180 (in the user space 115), with each read buffer 180 corresponding to a different logical block requested by the read call 125. Further, the filesystem scanner 120 may populate each read buffer 180 with a sequence number that represents the order of the corresponding logical block in the contiguous set of logical blocks.

Figure 2A:
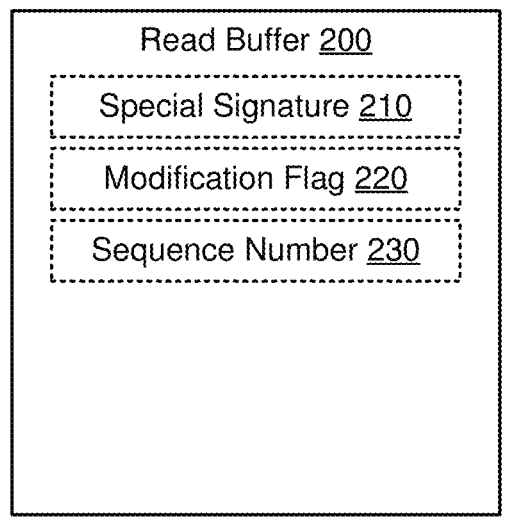
FIGS. 2A-2B are illustration of example data structures, in accordance with some implementations.
Figure 2B:
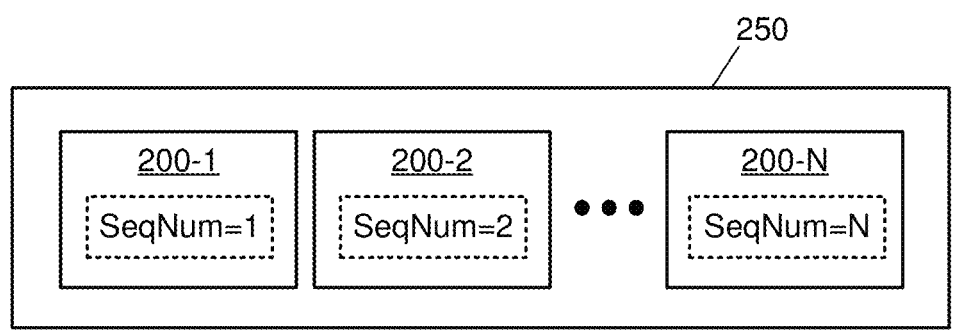

FIGS. 2A-2B—Example Data Structures

FIG. 2A shows an illustration of an example read buffer 200, in accordance with some implementations. Referring now to FIGS. 1-2A, the read buffer 200 may correspond generally to an example implementation of the read buffer 180. In some implementations, the read buffer 200 may be generated by a filesystem scanner 120 prior to (or concurrently with) sending a read call 125 for a particular data block. The read buffer 200 may be located in the in the user space 115 of the memory 114.

In some implementations, the filesystem scanner 120 may populate the read buffer 200 with a special signature 210, a modification flag 220, and a sequence number 230. The special signature 210 may be a predefined identifier (e.g., bit sequence, text string, numerical string, etc.) that indicates that the read call (associated with the read buffer 200) is to perform a block change detection operation for the requested data block.

In some implementations, the modification flag 220 may be a Boolean value (e.g., a bit value) that indicates whether the requested data block was modified in a backup of a filesystem. In some implementations, when the read buffer 200 is generated and populated, the filesystem scanner 120 may initially set the modification flag 220 to indicate that the data block was not modified in the backup. Subsequently, if the block filter driver 140 determines that the requested data block was modified in the backup, the block filter driver 140 modifies or sets the modification flag 220 to indicate that the data block was modified in the backup.

In some implementations, the sequence number 230 may indicate the order of the corresponding data block in a contiguous set of data blocks that are requested by the filesystem scanner 120 (e.g., in a single read call 125). In such implementations, the filesystem scanner 120 may generate a set of multiple read buffers 180 (in the user space 115), with each read buffer 180 corresponding to a different data block. For example, referring now to FIG. 2B, shown an illustration of an example buffer group 250 that includes multiple read buffers 200 (labelled from 200-1 to 200-N in FIG. 2B). As shown, each read buffer 200 in the buffer group 250 may include a sequence number ("SeqNum") that indicates the order of the corresponding data block. The buffer group 250 may be generated by the filesystem scanner 120 when a single read call is issued to request a contiguous set of multiple data blocks.

Figure 3:
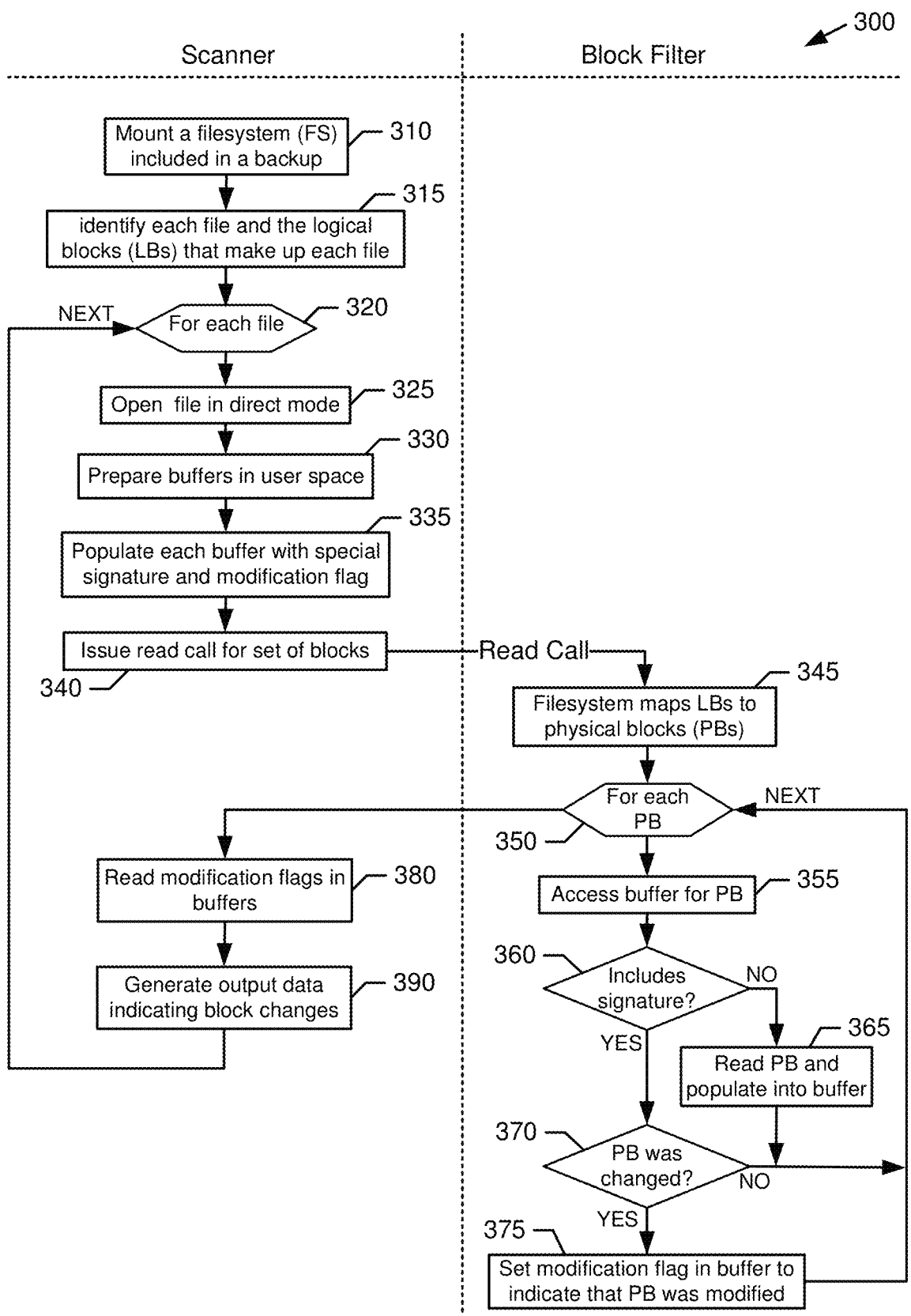
FIG. 3 is an illustration of an example process, in accordance with some implementations.

FIG. 3—Example Process for Generating Block Change Information

FIG. 3 shows an example process 300 for generating block change information, in accordance with some implementations. The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. As shown in FIG. 3, in some implementations, various actions of the process 300 may be performed by a scanner (e.g., filesystem scanner 120 shown in FIG. 1) and a block filter (e.g., block filter driver 140 shown in FIG. 1). For the sake of illustration, details of the process 300 may be described below with reference to FIGS. 1 and 2A-2B, which show some example implementations. However, other implementations are also possible.

Block 310 may include mounting a filesystem (FS) included in a backup. Block 315 may include identifying each file in the filesystem, as well as the logical blocks (LBs) that make up each file. For example, referring to FIG. 1, the filesystem scanner 120 mounts a backup 170 stored in the block-level storage 160, and identifies each file in the filesystem 130. Further, the filesystem scanner 120 accesses the filesystem 130 to identify the logical blocks included each file.

Referring again to FIG. 3, at block 320, a loop (defined by blocks 325, 330, 335, 340, 380, 390) may be entered to process each file that was identified in the filesystem. Block 325 may include opening the file in a direct mode. Block 330 may include preparing buffers in user space. Block 335 may include populating each buffer with a special signature and a modification flag. Block 340 may include issuing a read call for a set of logical blocks. Block 345 may include mapping, by the mounted filesystem, each logical block to its corresponding physical block. For example, referring to FIGS. 1-2B, the filesystem scanner 120 selects a particular file of the filesystem 130, and opens the file using a direct I/O mode (e.g., by issuing an open system call for the file using a command flag to invoke the direct I/O mode). Further, the filesystem scanner 120 generates a buffer group 250 that includes multiple read buffers 200, where each read buffer 200 corresponds to a different logical block of the file. The filesystem scanner 120 populates each read buffer 200 with a special signature 210, a modification flag 220, and a sequence number 230. Further, the filesystem scanner 120 issues a read call 125 to request a contiguous set of logical blocks that are included in the file. The filesystem 130 receives the read call 125 from the filesystem scanner 120, and translates each requested logical block to its corresponding physical block.

Referring again to FIG. 3, at block 350, a loop (defined by blocks 355, 360, 365, 370, 375) may be entered to process each physical block that was mapped to a requested logical block. Block 355 may include accessing the read buffer corresponding to the current physical block. Decision block 360 may include determining whether the read buffer includes a predefined special signature that indicates a block change detection operation. If it is determined that the read buffer does not include the predefined signature ("NO"), the process 300 may continue at block 365, including obtaining or reading the physical block from persistent storage, and populating the obtained physical block into the read buffer. After block 365, the process 300 may return to block 350 (i.e., to process another physical block). For example, referring to FIG. 1, the block filter driver 140 receives a read call 125 from the filesystem 130, and then determines whether the corresponding read buffer 180 includes the predefined special signature. If the read buffer 180 does not include the predefined special signature, the block filter driver 140 allows the read call 125 to be executed to retrieve the physical block from the block-level storage 160.

Referring again to FIG. 3, if it is determined at decision block 360 that the read buffer includes the predefined special signature ("YES"), the process 300 may continue at decision block 370, including determining whether the physical block was modified in the backup. If it is determined at decision block 370 that the physical block was modified in the backup ("YES"), the process 300 may continue at block 375, including setting a modification flag in the read buffer to indicate that the physical block was modified in the backup. After block 375, or if it is determined at decision block 370 that the physical block was not modified in the backup ("NO"), the process 300 may return to block 350 (i.e., to process another physical block). For example, referring to FIG. 1, the block filter driver 140 determines that the read buffer 180 includes the predefined special signature, and in response performs a look-up for a requested physical block in the changed-block data 150. In some implementations, the changed-block data 150 is a bitmap that is generated as part of (or along with) the backup 170, and which indicates whether each physical block was modified in the backup 170 (e.g., using bit values that correspond to each physical block). If the block filter driver 140 determines that the current physical block was modified in the backup 170 (based on the changed-block data 150), the block filter driver 140 sets the modification flag 220 (in the read buffer 200) to indicate that the requested logical block was modified in the backup 170. Otherwise, if the block filter driver 140 determines that the requested physical block was not modified in the backup 170, the block filter driver 140 may be set (or leave unchanged if already set) the modification flag 220 to indicate that the requested logical block was not modified in the backup 170.

Referring again to FIG. 3, after processing the set of physical blocks at block 350, the process 300 may continue at block 380, including reading the modification flags in the set of read buffers (created at block 330) to determine which of the requested logical blocks were modified during the backup. Block 390 may include generating output data (e.g., a portion of report or a list) that identifies each file and/or logical block that was modified during the backup. After block 390, the process 300 may return to block 320 (i.e., to process another file in the filesystem). Further, after processing all files in the filesystem at block 320, the process 300 may be completed. For example, referring to FIG. 1, after issuing the read call 125 for a set of logical blocks, the filesystem scanner 120 reads the modification flags 220 in the read buffers 200 (in buffer group 250) to determine whether the corresponding logical blocks were modified during the backup 170. Further, after processing each file in the filesystem 130 (e.g., by issuing read calls 125 for all logical blocks), the filesystem scanner 120 generates modification data 190 that identifies each file and/or logical block that was modified during the backup 170.

Figure 4:
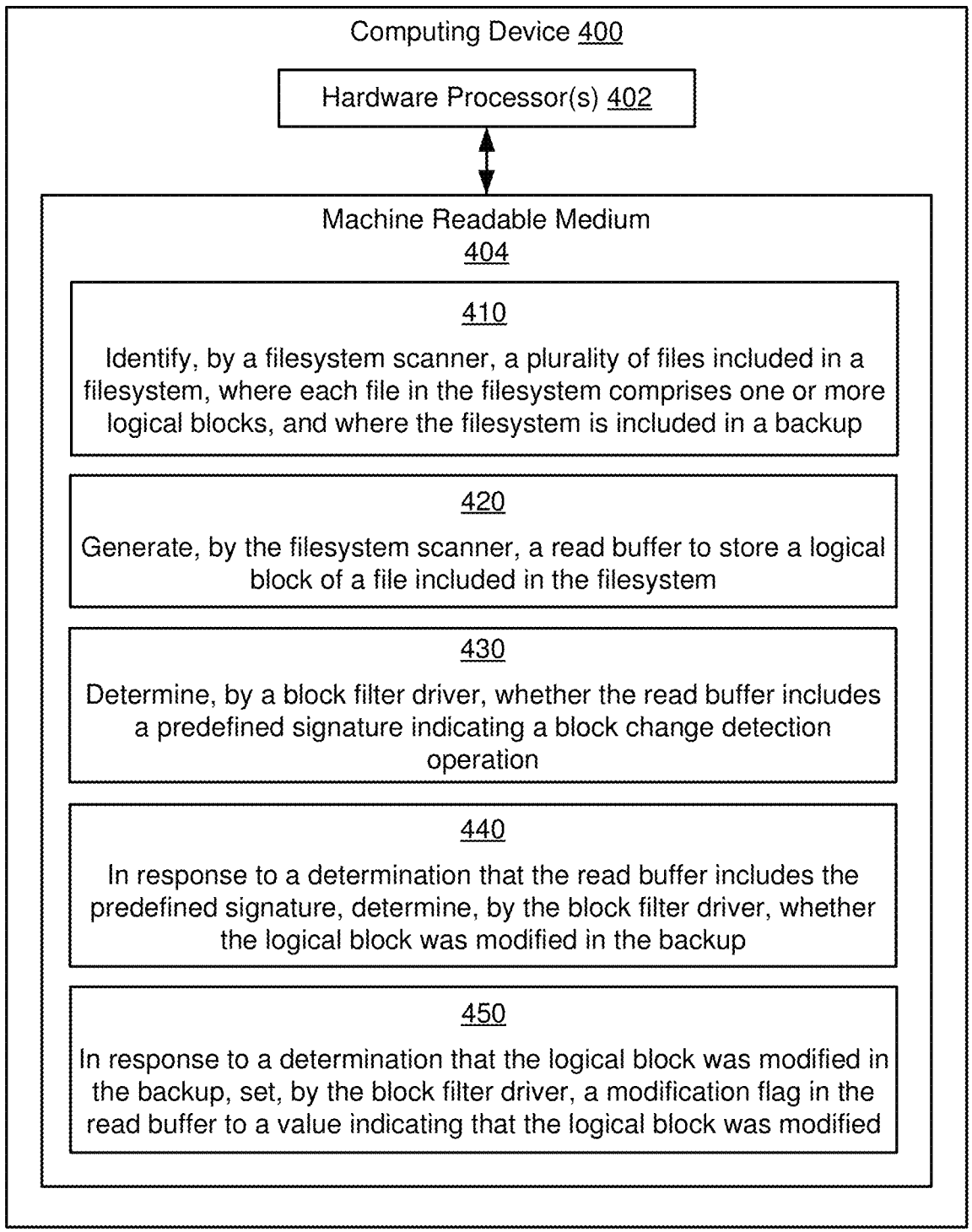
FIG. 4 is a schematic diagram of an example computing device, in accordance with some implementations.

FIG. 4—Example Computing Device

FIG. 4 shows a schematic diagram of an example computing device 400. In some examples, the computing device 400 may correspond generally to some or all of the computing device 110 (shown in FIG. 1). As shown, the computing device 400 may include a hardware processor 402 and machine-readable storage 405 including instructions 410-450. The machine-readable storage 405 may be a non-transitory medium. The instructions 410-450 may be executed by the hardware processor 402, or by a processing engine included in hardware processor 402.

Instruction 410 may be executed to identify, by a filesystem scanner, a plurality of files included in a filesystem, where each file in the filesystem comprises one or more logical blocks, and where the filesystem is included in a backup. For example, referring to FIG. 1, the filesystem scanner 120 mounts a backup 170 stored in the block-level storage 160, and identifies each file in the filesystem 130. Further, the filesystem scanner 120 accesses the filesystem 130 to identify the logical blocks included each file.

Referring again to FIG. 4, instruction 420 may be executed to generate, by the filesystem scanner, a read buffer to store a logical block of a file included in the filesystem. For example, referring to FIGS. 1-2B, the filesystem scanner 120 selects a particular file of the filesystem 130, and opens the file using a direct I/O mode (e.g., by issuing an open system call for the file using a command flag to invoke the direct I/O mode). Further, the filesystem scanner 120 generates a buffer group 250 that includes multiple read buffers 200, where each read buffer 200 corresponds to a different logical block of the file. The filesystem scanner 120 populates each read buffer 200 with a special signature 210, a modification flag 220, and a sequence number 230.

Referring again to FIG. 4, instruction 430 may be executed to determine, by a block filter driver, whether the read buffer includes a predefined signature indicating a block change detection operation. For example, referring to FIG. 1, the filesystem scanner 120 issues a read call 125 to request a contiguous set of logical blocks that are included in the file. The filesystem 130 receives the read call 125 from the filesystem scanner 120, and translates each requested logical block to its corresponding physical block. The block filter driver 140 receives the read call 125 from the filesystem 130, and determines whether the corresponding read buffer 180 includes the predefined special signature that indicates a block change detection operation.

Referring again to FIG. 4, instruction 440 may be executed to, in response to a determination that the read buffer includes the predefined signature, determine, by the block filter driver, whether the logical block was modified in the backup. Instruction 450 may be executed to, in response to a determination that the logical block was modified in the backup, set, by the block filter driver, a modification flag in the read buffer to a value indicating that the logical block was modified. For example, referring to FIG. 1, the block filter driver 140 determines that the read buffer 180 includes the predefined special signature, and in response performs a look-up for a requested physical block in the changed-block data 150. If the block filter driver 140 determines that the current physical block was modified in the backup 170 (based on the changed-block data 150), the block filter driver 140 sets the modification flag 220 (in the read buffer 200) to indicate that the requested logical block was modified in the backup 170.

Figure 5:
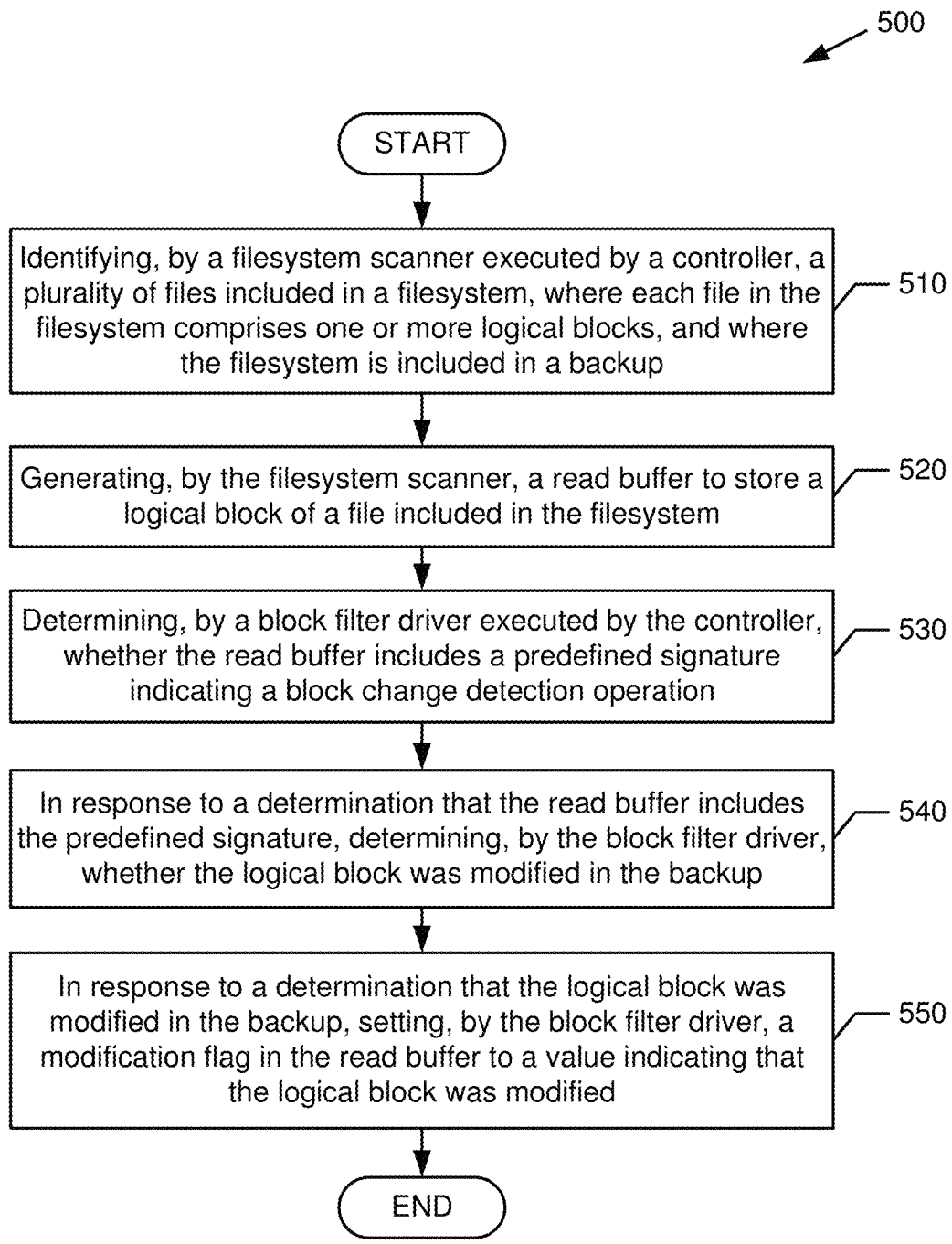
FIG. 5 is an illustration of an example process, in accordance with some implementations.

FIG. 5—Example Process

FIG. 5 shows an example process 500, in accordance with some implementations. In some examples, the process 500 may be performed by a computing device (e.g., the computing device 110 shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. However, other implementations are also possible.

Block 510 may include identifying, by a filesystem scanner executed by a controller, a plurality of files included in a filesystem, where each file in the filesystem comprises one or more logical blocks, and where the filesystem is included in a backup. Block 520 may include generating, by the filesystem scanner, a read buffer to store a logical block of a file included in the filesystem. Block 530 may include determining, by a block filter driver executed by the controller, whether the read buffer includes a predefined signature indicating a block change detection operation. Block 540 may include, in response to a determination that the read buffer includes the predefined signature, determining, by the block filter driver, whether the logical block was modified in the backup. Block 550 may include, in response to a determination that the logical block was modified in the backup, setting, by the block filter driver, a modification flag in the read buffer to a value indicating that the logical block was modified. Blocks 510-550 may correspond generally to the examples described above with reference to instructions 410-450 (shown in FIG. 4).

FIG. 6—Example Machine-Readable Medium

FIG. 6 shows a machine-readable medium 600 storing instructions 610-650, in accordance with some implementations. The instructions 610-650 can be executed by a single processor, multiple processors, a single processing engine, multiple processing engines, and so forth. The machine-readable medium 600 may be a non-transitory storage medium, such as an optical, semiconductor, or magnetic storage medium. The instructions 610-650 may correspond generally to the examples described above with reference to instructions 410-450 (shown in FIG. 4).

Instruction 610 may be executed to identify, by a filesystem scanner, a plurality of files included in a filesystem, where each file in the filesystem comprises one or more logical blocks, and where the filesystem is included in a backup. Instruction 620 may be executed to generate, by the filesystem scanner, a read buffer to store a logical block of a file included in the filesystem. Instruction 630 may be executed to determine, by a block filter driver, whether the read buffer includes a predefined signature indicating a block change detection operation. Instruction 640 may be executed to, in response to a determination that the read buffer includes the predefined signature, determine, by the block filter driver, whether the logical block was modified in the backup. Instruction 650 may be executed to, in response to a determination that the logical block was modified in the backup, set, by the block filter driver, a modification flag in the read buffer to a value indicating that the logical block was modified.

CONCLUSION

In accordance with some implementations described herein, a computing device may execute a filesystem scanner and a block filter driver to determine which files and data blocks have been modified in a particular backup. The filesystem scanner may identify each file in a filesystem, and may issue read calls to retrieve the data blocks in the identified files. Further, the filesystem scanner may write a special signature into the read buffers for the read calls. The block filter driver may intercept each read call, and in response may determine whether the special signature is present in the read buffer associated with the read call. If the special signature is present in the read buffer, the block filter driver determines whether the requested data blocks were modified in a recent backup. In some implementations, a block change detection operation may involve performing a look-up of the requested data blocks in a changed-block data structure. Subsequently, the block filter driver may populate the read buffer with block change information indicating which data blocks (if any) were modified in the backup. The filesystem scanner may obtain the block change information from the read buffer, and may use this information to generate a modification report. In this manner, some implementations may provide block change information that identifies modifications to the filesystem that occur at the data block level, and that is generated in a manner that is not subject to timestamp manipulation by malware.

Note that, while FIGS. 1-6 show various examples, implementations are not limited in this regard. For example, referring to FIG. 1, it is contemplated that the system 100 may include additional devices and/or components, fewer components, different components, different arrangements, and so forth. In another example, it is contemplated that the functionality of the computing device 110 described above may be included in any another engine or software of the system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In the present disclosure, use of the term "a," "an," or "the" is intended to include the plural forms as well, unless the context clearly indicates otherwise. Also, the term "includes," "including," "comprises" "comprising," "have," or "having" when used in this disclosure specifies the presence of the stated elements, but do not preclude the presence or addition of other elements.

What is claimed is:

1. A computing device comprising:
   a controller; and
   a machine-readable storage storing instructions, the instructions executable by the processor to:
      identify, by a filesystem scanner, a plurality of files included in a filesystem, wherein each file in the filesystem comprises one or more logical blocks, and wherein the filesystem is included in a backup;
      generate, by the filesystem scanner, a read buffer to store a logical block of a file included in the filesystem;
      determine, by a block filter driver, whether the read buffer includes a predefined signature indicating a block change detection operation;
      in response to a determination that the read buffer includes the predefined signature, determine, by the block filter driver, whether the logical block was modified in the backup; and
      in response to a determination that the logical block was modified in the backup, set, by the block filter driver, a modification flag in the read buffer to a value indicating that the logical block was modified.

2. The computing device of claim 1, including instructions executable by the processor to:
   mount, by the filesystem scanner, the filesystem at a memory location;
   issue, by the filesystem scanner, a read call for the logical block; and
   translate, by the mounted filesystem, the logical block in the read call to a physical block.

3. The computing device of claim 1, wherein the filesystem scanner is executed in a user space of system memory, and wherein the block filter driver is executed in a kernel space of the system memory.

4. The computing device of claim 2, including instructions executable by the processor to:
   receive from the mounted filesystem, by the block filter driver, the translated read call for the physical block; and
   in response to a receipt of the translated read call for the physical block, determine, by the block filter driver, whether the read buffer includes the predefined signature.

5. The computing device of claim 4, including instructions executable by the processor to:
   in response to the determination that the read buffer includes the predefined signature, perform a look-up for the physical block in a changed block data structure associated with the backup; and
   determine whether the logical block was modified in the backup based on the look-up for the physical block in the changed block data structure.

6. The computing device of claim 5, wherein the changed block data structure is a changed block bitmap that is generated along with the backup.

7. The computing device of claim 2, including instructions executable by the processor to:
   prior to issuing the read call, issue, by the filesystem scanner, an open system call for the file using a command flag to invoke a direct input/output (I/O) mode.

8. The computing device of claim 2, wherein the read buffer is one of a plurality of read buffers generated by the filesystem scanner, and wherein each of the plurality of read buffers corresponds to a different logical block requested by the read call.

9. The computing device of claim 2, including instructions executable by the processor to:
in response to a determination that the read buffer does not include the predefined signature, obtain the physical block from persistent storage; and
populate the obtained physical block into the read buffer.

10. A method comprising:
identifying, by a filesystem scanner executed by a controller, a plurality of files included in a filesystem, wherein each file in the filesystem comprises one or more logical blocks, and wherein the filesystem is included in a backup;
generating, by the filesystem scanner, a read buffer to store a logical block of a file included in the filesystem;
determining, by a block filter driver executed by the controller, whether the read buffer includes a predefined signature indicating a block change detection operation;
in response to a determination that the read buffer includes the predefined signature, determining, by the block filter driver, whether the logical block was modified in the backup; and
in response to a determination that the logical block was modified in the backup, setting, by the block filter driver, a modification flag in the read buffer to a value indicating that the logical block was modified.

11. The method of claim 10, comprising:
mounting, by the filesystem scanner, the filesystem at a memory location;
issuing, by the filesystem scanner, a read call for the logical block; and
translating, by the mounted filesystem, the logical block in the read call to a physical block.

12. The method of claim 11, comprising:
receiving from the mounted filesystem, by the block filter driver, the translated read call for the physical block; and
in response to a receipt of the translated read call for the physical block, determining, by the block filter driver, whether the read buffer includes the predefined signature.

13. The method of claim 12, comprising:
in response to the determination that the read buffer includes the predefined signature, performing a look-up for the physical block in a changed block data structure associated with the backup; and
determining whether the logical block was modified in the backup based on the look-up for the physical block in the changed block data structure.

14. The method of claim 11, comprising:
prior to issuing the read call, issuing, by the filesystem scanner, an open system call for the file using a command flag to invoke a direct input/output (I/O) mode.

15. The method of claim 11, comprising:
in response to a determination that the read buffer does not include the predefined signature, obtaining the physical block from persistent storage; and
populating the obtained physical block into the read buffer.

16. A non-transitory machine-readable medium storing instructions that upon execution cause a controller to:
identify, by a filesystem scanner, a plurality of files included in a filesystem, wherein each file in the filesystem comprises one or more logical blocks, and wherein the filesystem is included in a backup;
generate, by the filesystem scanner, a read buffer to store a logical block of a file included in the filesystem;
determine, by a block filter driver, whether the read buffer includes a predefined signature indicating a block change detection operation;
in response to a determination that the read buffer includes the predefined signature, determine, by the block filter driver, whether the logical block was modified in the backup; and
in response to a determination that the logical block was modified in the backup, set, by the block filter driver, a modification flag in the read buffer to a value indicating that the logical block was modified.

17. The non-transitory machine-readable medium of claim 16, including instructions that upon execution cause the controller to:
mount, by the filesystem scanner, the filesystem at a memory location;
issue, by the filesystem scanner, a read call for the logical block; and
translate, by the mounted filesystem, the logical block in the read call to a physical block.

18. The non-transitory machine-readable medium of claim 17, including instructions that upon execution cause the controller to:
receive from the mounted filesystem, by the block filter driver, the translated read call for the physical block; and
in response to a receipt of the translated read call for the physical block, determine, by the block filter driver, whether the read buffer includes the predefined signature.

19. The non-transitory machine-readable medium of claim 18, including instructions that upon execution cause the controller to:
in response to the determination that the read buffer includes the predefined signature, perform a look-up for the physical block in a changed block data structure associated with the backup; and
determine whether the logical block was modified in the backup based on the look-up for the physical block in the changed block data structure.

20. The non-transitory machine-readable medium of claim 17, including instructions that upon execution cause the controller to:
in response to a determination that the read buffer does not include the predefined signature, obtain the physical block from persistent storage; and
populate the obtained physical block into the read buffer.

* * * * *